(12) United States Patent
Saito

(10) Patent No.: US 6,597,383 B1
(45) Date of Patent: Jul. 22, 2003

(54) POINTING APPARATUS AND A POINTING METHOD

(75) Inventor: Hitoshi Saito, Atsugi (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/082,212

(22) Filed: May 20, 1998

(30) Foreign Application Priority Data

Aug. 25, 1997 (JP) .............................................. 9-228288

(51) Int. Cl.⁷ ................................................. G09G 5/00
(52) U.S. Cl. ......................... 345/860; 345/856; 345/157
(58) Field of Search ................................ 345/145, 146, 345/157, 163, 856, 857, 339, 345, 334, 860, 768, 592

(56) References Cited

U.S. PATENT DOCUMENTS

| | | | | |
|---|---|---|---|---|
| 4,809,066 A | * | 2/1989 | Leberl et al. ................ | 358/107 |
| 5,361,081 A | * | 11/1994 | Barnaby ...................... | 345/145 |
| 5,473,343 A | * | 12/1995 | Kimmich et al. ........... | 345/145 |
| 5,559,943 A | * | 9/1996 | Cyr et al. ..................... | 395/155 |
| 5,561,444 A | * | 10/1996 | Johntson, Jr. et al. ...... | 345/145 |
| 5,694,150 A | * | 12/1997 | Sigona et al. ............... | 345/145 |
| 5,694,151 A | * | 12/1997 | Johntson, Jr. et al. ...... | 345/145 |
| 5,696,530 A | * | 12/1997 | Maejima ..................... | 345/127 |
| 5,905,497 A | * | 5/1999 | Vaughan et al. ............ | 345/352 |
| 5,914,723 A | * | 6/1999 | Gajewska ................... | 345/431 |
| 6,020,887 A | * | 2/2000 | Loring et al. ............... | 345/340 |
| 6,067,085 A | * | 5/2000 | Modh et al. ................. | 345/339 |
| 6,075,531 A | * | 6/2000 | DeStefano ................... | 345/340 |

FOREIGN PATENT DOCUMENTS

| | | | |
|---|---|---|---|
| EP | 0 762 756 A2 | 12/1997 | |
| WO | WO 94/24818 | 10/1994 | |
| WO | WO 96/33579 | 10/1996 | |

OTHER PUBLICATIONS

IBM Technical Disclosure Bulletin, Semi–Transparent Cursor, Oct. 1995, vol. 38, p. 271–272.*

* cited by examiner

Primary Examiner—Richard Hjerpe
Assistant Examiner—Kevin M. Nguyen
(74) Attorney, Agent, or Firm—J. Bruce Schelkopf; Bracewell & Patterson LLP

(57) ABSTRACT

A positioning apparatus capable of making a position of a pointer on a screen stand out and be prominent at appropriate timing for the user when the user uses a pointing device, such as a mouse. A color of an image within a first region on a screen and a color of an image within a second region, a size of which differs from the size of the first region, are alternately displayed by inverting the image data of the image within the region around a mouse cursor, during the simultaneous depression of a right button of the mouse and a shift key of a keyboard by the user. The use of a rectangular area as the first region in which the center of the area aligns to the coordinate values ($M_X$, $M_Y$) of the mouse cursor, and the coordinate values of a top right corner are represented by ($M_X+L_1$, $M_Y+L_1$) and the coordinate values of a bottom left corner are represented by ($M_X-L_1$, $M_Y-L_1$), and a rectangular area as the second region in which the center of the area aligns to the coordinate values ($M_X$, $M_Y$) of the mouse cursor, and the coordinate values of the top right corner are represented by ($M_X+L_2$, $M_Y+L_2$) and the coordinate values of a bottom left corner are represented by ($M_X-L_2$, $M_Y-L_2$), causes an amount of calculation for changing the color to be decreased, wherein the L1 and L2 are predetermined constant values.

26 Claims, 9 Drawing Sheets

POINTING APPARATUS AND A POINTING METHOD

FIELD OF THE INVENTION

The present invention relates a pointing apparatus and a pointing method for displaying a pointer at a pointed position on a screen of a display device of a computer in response to a pointing operation performed by a user through a mouse, and for changing a color of an image around the displayed pointer to make the displayed pointer stand out in response to an input by a user through a key or an absence of an input by a user through a key during a predetermined period.

BACKGROUND OF THE INVENTION

In a computer operation based upon a GUI (graphical user interface), a method is used in which a user points out a desired position of an image on a screen displayed by a computer through a pointing device, such as a mouse, and the computer gets operational data in the image specified by the pointer.

In this method, an image of the pointer, such as a mouse cursor, is displayed at a position within the image pointed at, in or on by the user through the mouse, and the user performs a selection and a confirmation of the operation by observing the pointer and the position within the image pointed to by the pointer.

There is a problem that since the size of the pointer, such as the mouse cursor, is relatively small, it is difficult for the user to find or identify the pointer or it takes a long time to find or locate the pointer when the user has lost sight of the pointer. The problem becomes more pronounced in the case where the computer displays multiple windows on the screen, displays the image on a large size screen, or dividedly displays the image on plural monitor devices.

To solve the problem, a method calling for a comet cursor in which a trace of the movement of the pointer is displayed during a short period was used. However, it is extremely difficult to make the pointer be pronounced or stand out when the pointer is stopped.

Japanese publications of unexamined patent applications H4-52922 (Article 1) and H7-160416 (Article 2) disclose methods for displaying the pointer by changing a shape of the pointer. However, the Article 1 document merely discloses a method for changing the image of the pointer in response to a switch of the operation of the mouse (mouse mode), and does not disclose a method for causing the user to easily identify the pointer by making the pointer stand out or be noticeable.

The Article 2 document discloses a method for changing a shape, size, color or gradation of the pointer or blinking the pointer each time the user touches the mouse. However, these methods cause problems in that the pointer is changed whenever the user touches the mouse, though the user does not want to do so; it is impossible to make the pointer stand out enough in the case where the size of the pointer is not increased, but the shape, color or gradation is changed; alternatively, when the size of the pointer is increased, the GUI image below the image of the enlarged pointer is hidden.

The present invention was made based upon the recognition of the above problems. An object of the present invention is to provide an improved pointing apparatus and an improved pointing method capable of making a position of the pointer on the screen stand out at an appropriate time for the user when the user points out a position on the screen by using the pointing apparatus, such as the mouse.

Another object of the present invention is to provide an improved pointing apparatus and a pointing method for causing the user to easily find the pointer on the screen to improve the usability of the computer in the case that the user lost sight of the pointer on the screen, the computer displays multiple windows on the screen, displays the image on a large size screen, or displays the divided image on plural monitor device.

In accordance with the pointing device and the pointing method of the present invention, it is possible to make the position of the pointer on the screen stand out at the appropriate intervals for the user under the circumstances where the user points out the position on the screen using pointing device, such as the mouse.

Also, in accordance with the pointing device and the pointing method of the present invention, it is possible for the user to easily find out the pointer on the screen to improve a usability of the computer in the case that the user lost sight of the pointer on the screen, the computer displays multiple windows on the screen, displays the image on a large size screen, or displays the image on plural monitor device.

SUMMARY OF THE INVENTION

To achieve the above objects and other improvements, a pointing apparatus in accordance with the present invention includes, an image display for displaying an image on a screen, a pointing device for pointing to any position on the screen to display a pointer at the pointed position on the screen, and an image changing feature responsive to an external input for changing the image within at least a predetermined area around the displayed pointer on the screen.

The image changing feature changes at least color of the image within the predetermined area around the displayed pointer on the screen. The image changing feature further changes a size of the predetermined area around the displayed pointer. The image changing feature inverts values of image data constituting the image within the area around the displayed pointer.

The pointing apparatus in accordance with the present invention responds to depressing a key of a keyboard to change the color of the image within the predetermined area, such as a square area or a circular area having a center aligned to the center of the pointer, around the pointer, such as a mouse cursor, displayed on the screen to make the position of the pointer stand out without preventing the user's observation of the image within the area. In the case that the computer displays plural windows on the screen, the computer displays the image on a large screen, or the computer dividedly displays the image on plural screens.

In the pointing apparatus in accordance with the present invention, the image display device is a monitor device, for example, of the computer, and displays the GUI image inputted from the computer on its screen. The pointing apparatus responds to the depression of a button of the mouse to point to a position on the GUI image selected by the user and to display the pointer, such as a mouse cursor, at the pointed position.

The image changing feature changes the color of the image within a square area (alternative shapes can be used) which surrounds the pointer and has a center aligned to the center of the pointer by inverting the image data of the image (inverting "1" and "0" of the image data in the case that the image data is represented by binary notation) within the square area, and changes the size of the area including the image data to be changed at a predetermined constant interval to make the position of the pointer stand out, in the case that the user depresses a predetermined key of the keyboard of the computer to make the position of the pointer stand out or the user does not perform any input operation to the computer during a predetermined period.

Since the display of the image by inverting the image data causes the shapes of characters, symbols and patterns in the image displayed in the area around the pointer to be maintained, the observation or recognition of the GUI image by the user is not obscured or prevented. Further, when the size of the area containing the image, the color of which image has been changed, is changed at the predetermined interval, the position of the pointer is made to stand out more clearly in comparison with the case that the size of the area is not changed, so that the user can find or locate the pointer more readily.

The pointing method in accordance with the present invention includes the steps of displaying an image on a screen, pointing to, at or on any position on the screen to display a pointer at the pointed position on the screen, and changing the image within at least a predetermined area around the displayed pointer on the screen.

A computer readable recording medium in accordance with the present invention records a program for causing a computer to execute steps of displaying an image on a screen, pointing to any position on the screen to display a pointer at the pointed position on the screen, and changing the image within at least a predetermined area around the displayed pointer on the screen.

Figure 10:
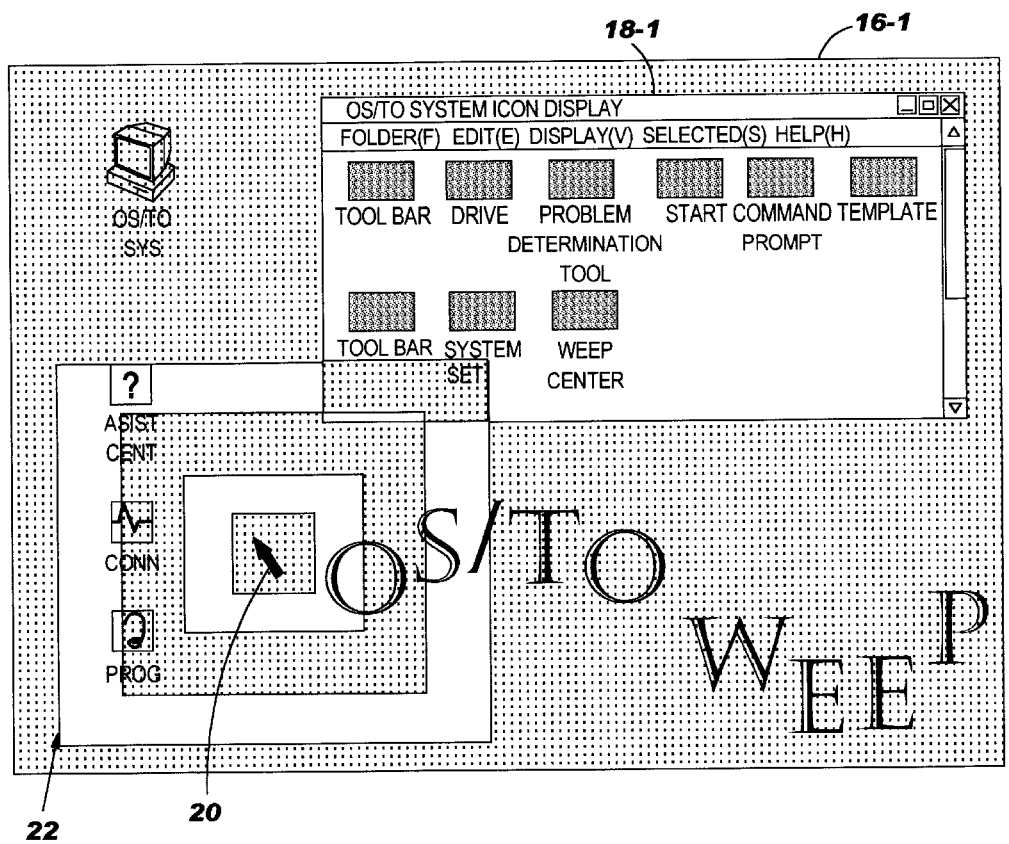

The FIG. 10 shows how the user sees the image within the area around the mouse cursor 20 due to an after image affect when the color of the image within the area around the mouse cursor 20 is changed at intervals of about 1 ms to about 100 ms, as shown in FIGS. 5–9.

DETAILED DESCRIPTION OF THE PREFERRED EMBODIMENT

In the description of the preferred embodiment the following symbols, reference characters and identifiers apply: 1 . . . computer system, 10 . . . computer, 100 . . . operating system, 102 . . . input check section, 104 . . . drawing section, 12 . . . keyboard, 120 . . . shift key, 14 . . . mouse, 140 . . . left button, 142 . . . right button, 16, 16-1 . . . 16-K . . . display device, 18-1, 18-2 . . . window, 20 . . . mouse cursor, and 22, 22-1 . . . 224 . . . area having the color changed.

Figure 1:
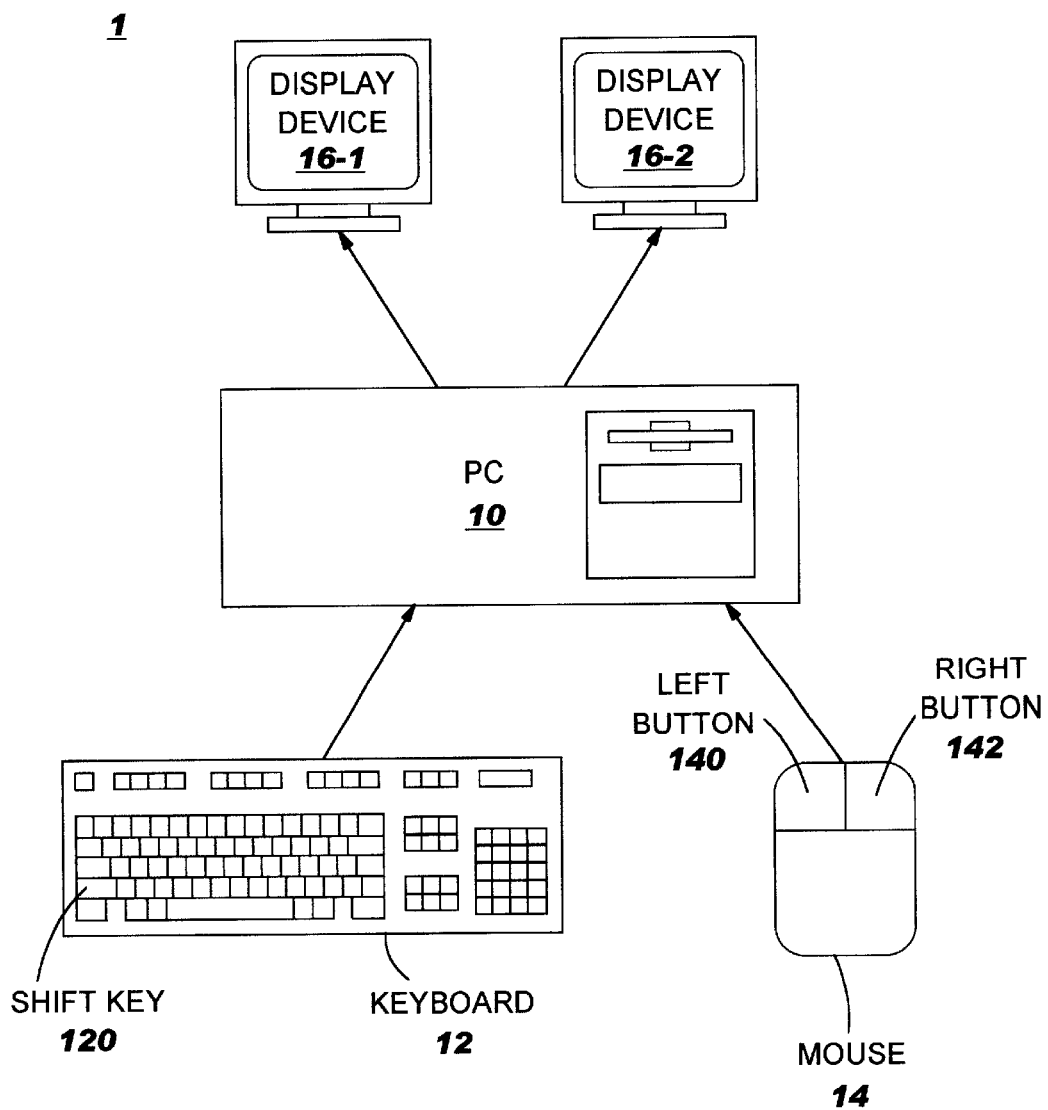
FIG. 1 shows the example of the computer system into which the pointing method of the present invention is applied.

The FIG. 1 shows a constitution, network or environment of the computer system 1 to which the pointing method of the present invention is applied. As shown in FIG. 1, the computer system 1 comprises a general type computer (PC) 10 containing a CPU, a memory and a hard disk drive etc., a keyboard 12 containing various keys, such as a shift key 120, a general type mouse 14 containing a left button 140 and a right button 142, and K number of display devices, including devices 16-1 and 16-2 (FIG. 1 shows the exemplary case wherein K=2), such display devices as CRT display devices, or liquid crystal display devices (LCD).

The computer system 1 displays an image containing a plurality of windows on a screen of one of the display devices 16-1 . . . 16-K or on all the screens of the display devices 16-1 . . . 16-K which are treated as one display device, and responds to the pointing operation by the user through the mouse 14 to point out a position selected by the user on the screen for displaying the pointer, such as a mouse cursor at the pointed position on the screen.

Further, the computer system 1 responds to a depression by the user of the shift key 120 of the keyboard 12, for example, to change a color and size of a predetermined area around the displayed mouse cursor on the display devices 16-1 and 16-2 at a predetermined interval of time for causing an afterimage effect, such as at intervals of about 1 ms to about 100 ms to make the displayed position of the mouse cursor stand out, whereby the user can easily find out the mouse cursor.

Figure 2:
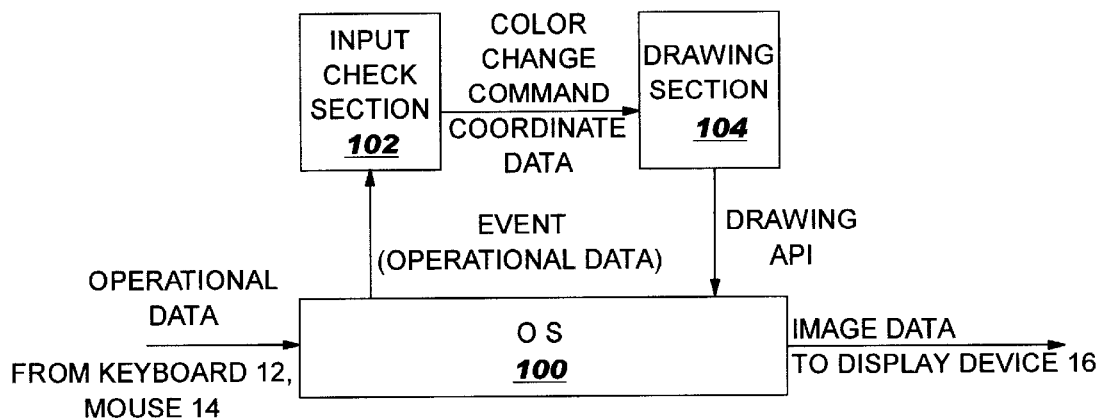
FIG. 2 shows the general flow and relationship of the softwares in the computer shown in FIG. 1 for realizing the pointing method of the present invention.

FIG. 2 shows the arrangement of software for realizing the pointing method of the present invention in the computer 10 shown in the FIG. 1. As shown in FIG. 2, the computer 10 contains an operating system (OS) 100, an input check section 102 and a drawing section 104 as software for realizing the pointing method of the present invention.
Operating System The FIGS. 3(A) and (B); show an example of images displayed on the display devices 16-1 and 16-2 by the operating system 100 shown in the FIG. 2. The FIGS. 4(A)–(C) show the method for changing the color of the image within the predetermined area around the mouse cursor 20 by the operating system 100 shown in the FIG. 2.

Figure 3A:
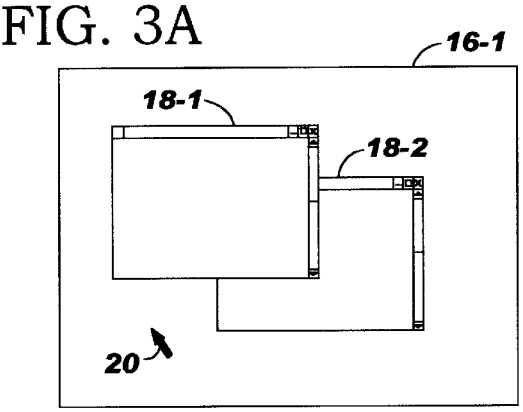
FIG. 3(A) and FIG. 3(B) show the example of the images displayed on the display device by the operating system shown in the FIG. 2.
Figure 4A:
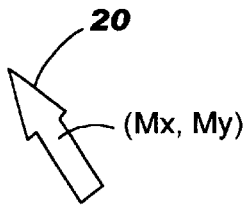
FIGS. 4(A)–4(C) show the method for changing the color of the area around the mouse cursor by the operating system shown in the FIG. 2.
Figure 4B:
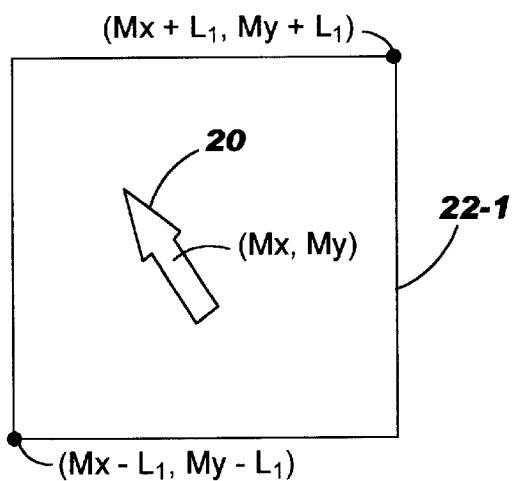
Figure 4C:
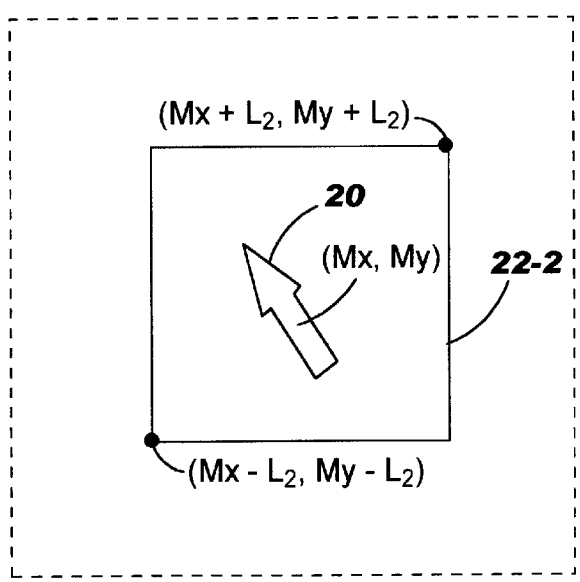

In the description made with reference to the FIGS. 3(A) and (B), the case in which the size of the predetermined area or scope around the mouse cursor 20 is changed between two different sizes is described as an example for simplifying the description.

The operating system 100 is the OS for a personal computer, such as OS/2 (Trade Mark of International Business Machines Corporation) or Windows (Trade Mark of Microsoft Corporation), and performs an execution control of the application software in the computer 10 and a control operation for the keyboard 12, the mouse 14 and the display device 16.

The operating system 100 receives the user input operation inputted from the keyboard 12 and the mouse 14 to issue an event, including data (operational data) indicating whether the user has depressed the button 140 or 142 of the mouse 14 or the shift key 120 of the keyboard 12, to the input check section 102.

Figure 3B:
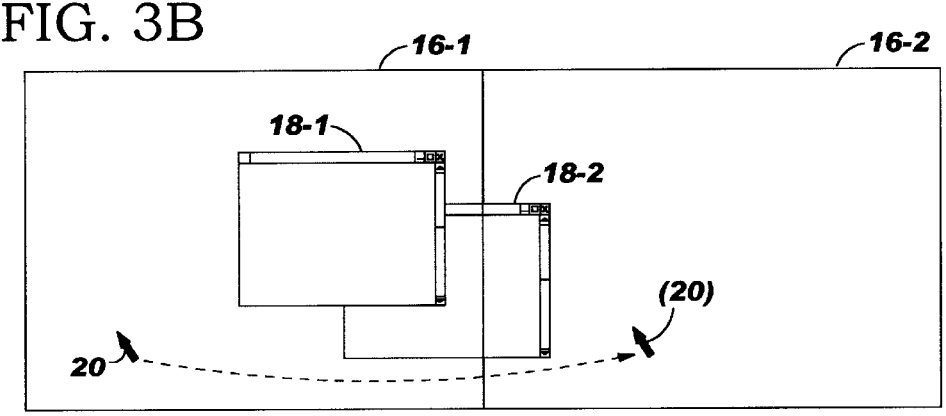

The operating system 100 displays the image including the plural windows 18-1 and 18-2 on the screen of one of the display devices 16-1, 16-2 . . . 16-k (in FIG. 3(A), i.e., the display device 16-1, or on the plural screens of the display devices 16-1, 16-2 . . . 16-k (in the FIG. 3(B), i.e., the display devices 16-1 and 16-2 which are handled as one display device, and moves the mouse cursor 20 among the plural display devices 16.

The operating system 100 responds to the pointing operation of the mouse 14 by the user, to display the pointer (the mouse cursor 20) at the position pointed to by the user on the screen of the display device 16 (note herein that the term "the display device 16" is used when the description is not directed to a particular one of the display devices 16-1 . . . 16-k) and outputs the data indicating the coordinate of the mouse cursor 20 (coordinate data represented by the number of picture elements (PEL) unit) to the input check section 102, as shown in the FIGS. 3(A) and (B) and FIG. 4(A).

The operating system 100 responds to an API (application programming interface) issued by the drawing section 104 to change the color of the image within a rectangular or square area 22-1 around the pointer 20 displayed on the screen of the display device 16, as shown in FIG. 4(B).

The operating system 100 responds to the API issued by the drawing section 104 to change the color of the image within the area 22-1 around the pointer 20 and to change the size of the area including the image having the color to be changed between the large size 22-1 and the small size 22-2 at intervals of about 1 ms to about 100 ms, as shown in the FIG. 4(C).

Input Check Section

The input check section 102 outputs a command (a color change command) for changing the color of the image within the area around the mouse cursor 20 and the coordinate data of the mouse cursor 20 to the drawing section 104 during a period that the operational data included in the event issued by the operating system 100 indicates the fact that the user simultaneously depresses the button 142 of the mouse 14 and the shift key 120 of the keyboard 12.

Drawing Section

The drawing section 104 responds to the inputted color change command from the input check section 102 to issue the drawing API for changing the color of the areas 22-1 and 22-2 on the screen of the display device 16. The change of the color is performed by inverting the image data of each PEL of the image (more particularly, by alternately inverting the logical value (0, 1) of each bit of the image data at intervals of about 1 ms to about 100 ms). More particularly, the color of image of the area 22-1 is initially changed, then the color of image of the area 22-2 is changed after a lapse of about 1 ms to about 100 ms, then the color of image of the area 22-1 is changed after a lapse of about 1 ms to about 100 ms, and so on.

A scope 22-1 is the rectangular area in which the center of the area 22-1 aligns to the coordinate values ($M_X$, $M_Y$) of the mouse cursor 20, and the coordinate values of a top right corner are represented by ($M_X+L_1$, $M_Y+L_1$) and the coordinate values of a bottom left corner are represented by ($M_X-L_1$, $M_Y-L_1$), as shown in the FIG. 4(B), and a scope 22-2 is the rectangular area in which the center of the area 22-2 aligns to the coordinate values ($M_X$, $M_Y$) of the mouse cursor 20, and the coordinate values of a top right corner are represented by ($M_X+L_2$, $M_Y+L_2$) and the coordinate values of a bottom left corner are represented by ($M_X-L_2$, $M_Y-L_2$), as shown in the FIG. 4(C), wherein the values $L_1$ and $L_2$ are constant values which are set into the drawing section 104 by the user through the keyboard 12.

Operation of the Computer System

Figure 5:
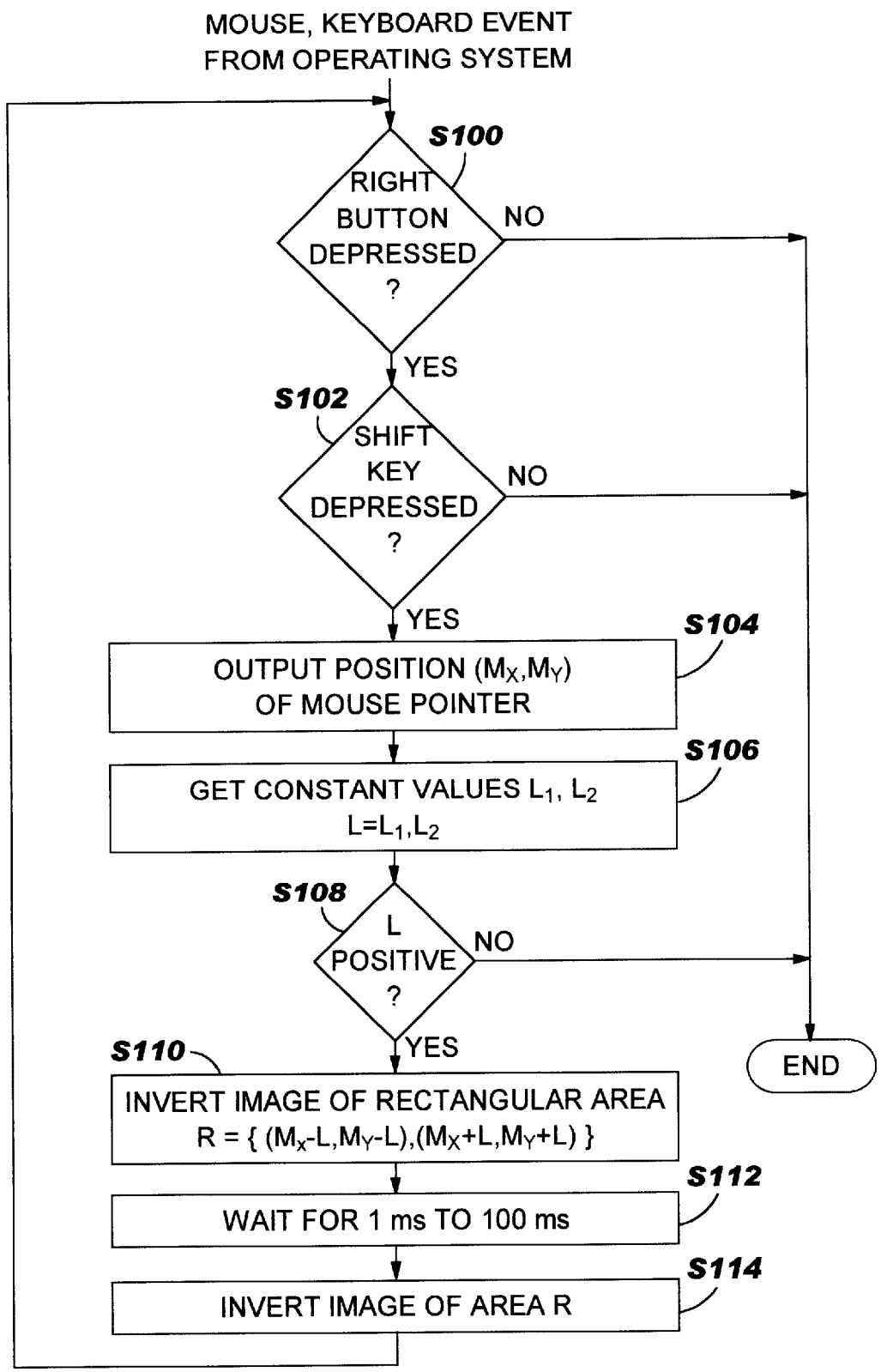
FIG. 5 shows the flow chart showing the operation of the softwares of the computer shown in the FIG. 2.
Figure 6:
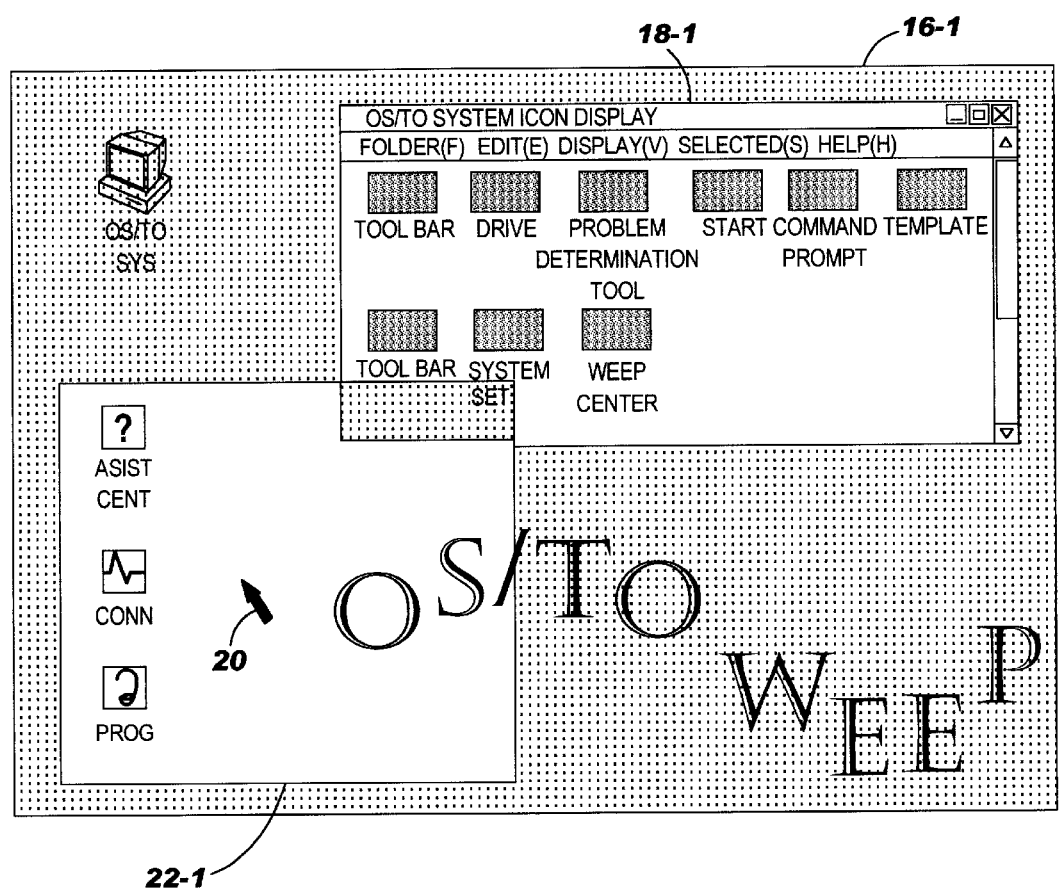
FIG. 6 is a first illustration showing the nature of change in the color in the area around the mouse cursor in the computer system in the case that the size of the area around the mouse cursor as shown in the FIGS. 4(A)–4(C) is changed among the four different sizes.
Figure 7:
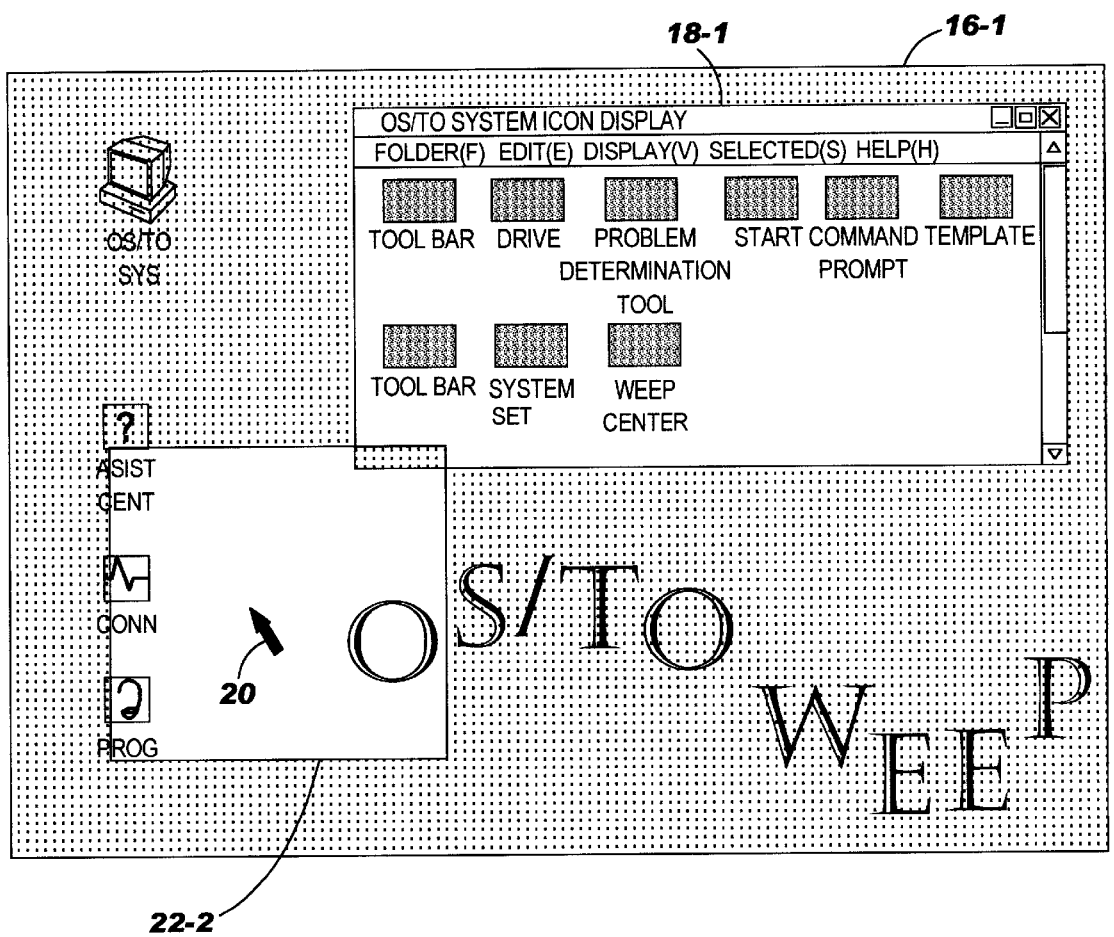
FIG. 7 is a second illustration showing the manner of change to the color in the area around the mouse cursor in the computer system in the case that the size of the area around the mouse cursor is changed among the four different sizes.
Figure 8:
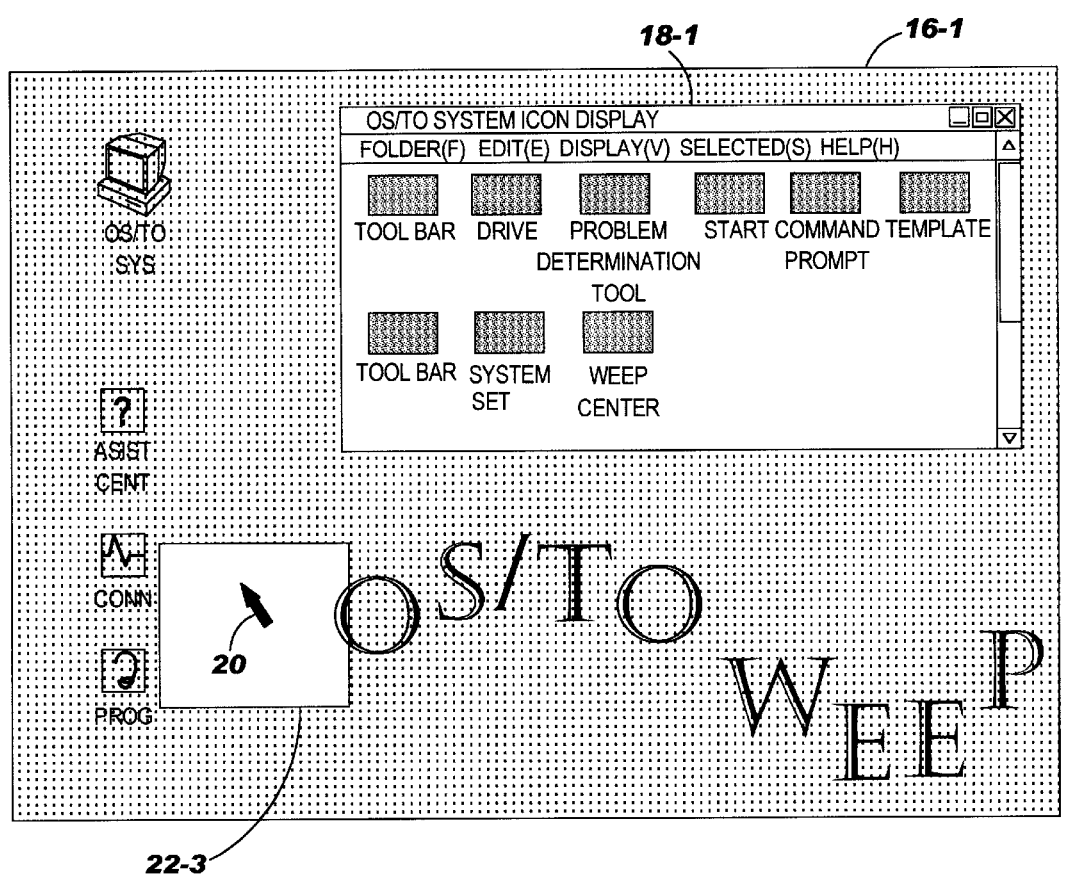
FIG. 8 is a third illustration showing the manner of how to change the color in the area around the mouse cursor in the computer system in the case that the size of the area around the mouse cursor is changed among the four different sizes.
Figure 9:
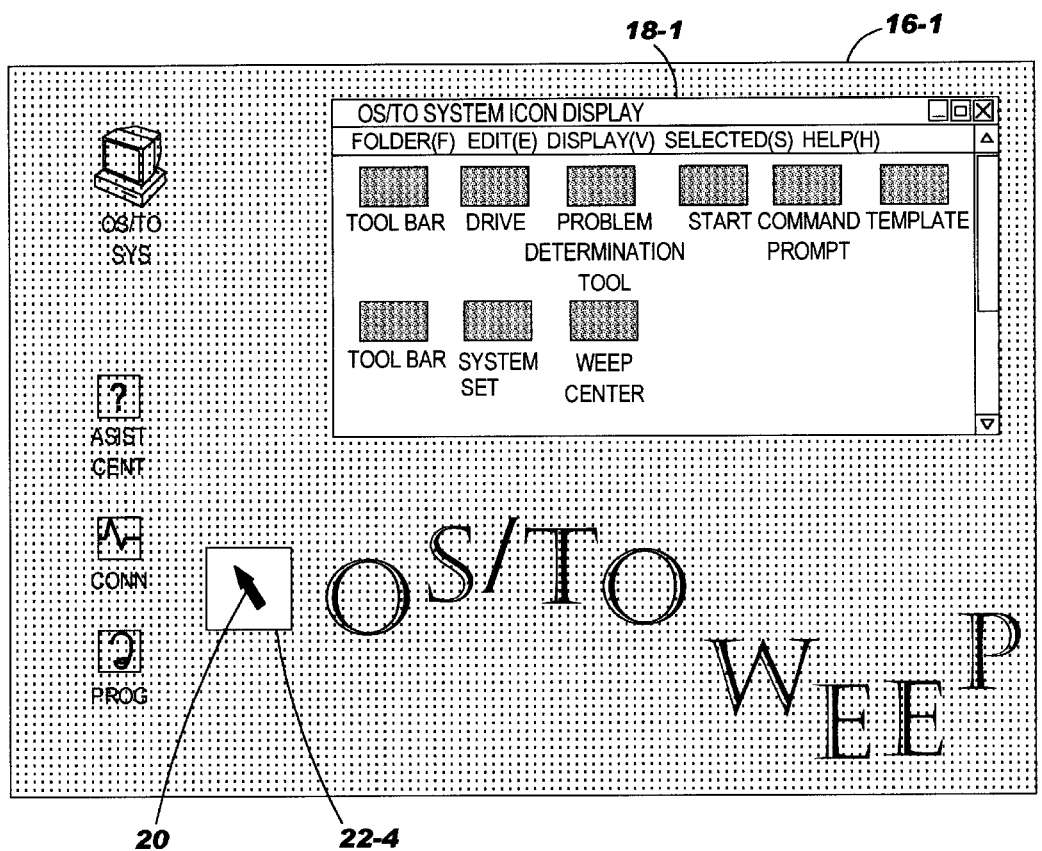
FIG. 9 is a fourth illustration showing the manner of how to change the color in the area around the mouse cursor in the computer system in the case that the size of the area around the mouse cursor is changed among the four different sizes.

The operation of the computer system 1 is described below with reference to the FIG. 5. FIG. 5 shows a flow chart indicating the operation of each software of the computer 10 shown in the FIG. 2.

When the user depresses the buttons 140 and 142 of the mouse 14 and the shift key 120 of the keyboard 12, the operating system 100 outputs the operational data indicating the coordinate values ($M_X$, $M_Y$) of the mouse cursor 20 and the depressed button and the key to the input check section 102.

In a step S100 shown in the FIG. 5, the input check section 102 determines whether the operational data inputted from the operating system 100 indicates that the user is depressing the right button 142 of the mouse 14, or not. If the data indicates that the user depresses the button 142, the operation proceeds to a step S102, and if the answer of the step S100 is NO, the operation is terminated.

In the step S102, the input check section 102 determines as to whether the operational data inputted from the operating system 100 indicates that the user depresses the shift key 120 of the keyboard 12, or not. If the data indicates that the user depresses the shift key 120, the operation proceeds to a process in a step S104, and if the answer of the step S102 is NO, the operation is terminated.

In a step S104, the input check section 102 issues the color change command and the coordinate values ($M_X$, $M_Y$) of the mouse cursor 20 to the drawing section 104.

In a step S106, when the drawing section 104 receives the color change command, the drawing section 104 alternately gets one of the constant values $L_1$ and $L_2$ in a manner that the drawing section 104 gets the constant value $L_1$ in the odd numbered process and gets the constant value $L_2$ in the even numbered process to substitute the $L_1$ and $L_2$ for the variable L.

In a step S108, the drawing section 104 determines as to whether the variable L is a positive value, or not. If the variable L is the positive value, the operation proceeds to a process in a step S110. If the variable L is not the positive value, the drawing section 104 considers that the variable L is invalid, and terminates the operation.

In the step S110, the drawing section 104 issues an API for inverting the image data of the image within the one of the areas 22-1 and 22-2 rectangular region R; if the variable $L=L_1$, the area 22-1 in FIG. 4(B) is selected, and if the variable $L=L_2$, the area 22-2 in FIG. 4(C) is selected to the operating system 100. The operating system 100 responds to the API issued by the drawing section 104 to change the color of the image within the area around the mouse cursor 20.

In a step S112, the drawing section 104 waits for about 1 ms to about 100 ms. In a step S114, the drawing section 104 issues an API to the operating system 100, which inverts the image data within the one of the areas 22-1 and 22-2 rectangular region R; if the variable $L=L_1$, the area 22-1 in the FIG. 4(B) is selected, and if the variable $L=L_2$, the area 22-2 in the FIG. 4(C) is selected the color of which was changed in the process in the step S112, and which returns the color to the original color. The operating system 100 responds to the API issued by the drawing section 104 to return the color of the image within the area around the mouse cursor 20 to the original color.

Actual Example of the Pointing Operation in the Computer System

The manner of how to change the color of the image within the area around the mouse cursor 20 is described with reference to the FIGS. 6–10.

FIGS. 6–9 are a first figure through a fourth figure which show the manner how to change the color of the image within the area around the mouse cursor 20 in the computer system 1 in the case that the size of the area around the mouse cursor 20 is changed among four different sizes.

FIG. 10 is an exemplary figure which shows how the user sees the image within the area around the mouse cursor 20 due to an afterimage effect when the color of the image within the area around the mouse cursor 20 is changed at intervals of about 1 ms to about 100 ms, as shown in the FIGS. 5–9.

In the case that the computer 10 in the computer system 1 displays an image including one window 18-1 on the display device 16-1, and sequentially substitutes four kinds of constant values $L_1$–$L_4$ for the variable L in the software process shown in the FIG. 5 (for example, $L_1$=200 PELs, $L_2$=150 PELs, $L_3$=100 PELs and $L_4$=50 PELs), to change the size of the area or scope, a color of which should be changed, among the four ranges to make the mouse cursor stand out, the computer 10 responds to the keying operation by the user to sequentially invert the image data of the displayed image within each of the four areas 22-1 . . . 224, sizes of which differ from each other, at intervals of about 1 ms to about 100 ms, wherein the area or scope 22-1 is a region of 200 PELs×200 PELs and has a center aligned to the coordinate values of the mouse cursor 20, as shown in the FIG. 4(A), the area or scope 22-2 is a region of 150 PELs×150 PELs and has a center aligned to the coordinate values of the mouse cursor 20, the area or scope 22-3 is a region of 100 PELs×100 PELs and has a center aligned to the coordinate values of the mouse cursor 20, and the area or scope 224 is a region of 50 PELs×50 PELs and has a center aligned to the coordinate values of the mouse cursor 20.

Since the area or scope 22-1 . . . 22-4 are actually switched at intervals of about 1 ms to about 100 ms which causes the afterimage effect, the user can see the images within the region 22 as if the four rectangular regions (the scopes 22-1 . . . 224), the centers of which are common, are displayed on the display device 16 with their state being alternately switched between the original state in which the color of the image is not inverted and the inverted state in which the color of the image is inverted.

In this manner, the change of the color by inverting the image data within the scopes 22-1 . . . 22-4 causes only the color of character, symbol and graphical pattern, etc. within the image to change, and the outlines of the character, the symbol and the graphical pattern are maintained, whereby the problem that the contents of the GUI image in the window 18-1 is hidden by the areas 22-1 and 22-4 and the user can not see the hidden image is solved.

Accordingly, the observation of the GUI image by the user is not prevented, and it is possible to cause the mouse cursor 20 to stand out without lowering the usability of the computer 10. The restore of the color of the image to the original color is performed by the twice inversion of the values of image data.

If the rectangle is used as the shape of the areas 22-1 and 22-4, the colors of which are changed, the determination as to whether the each PEL on the screen of the display device 16 is located within the areas 22-1 and 22-4 can be easily made, so that the drawing process for changing the colors becomes simple.

As described above, in accordance with the pointing method in the computer system 1 of the present invention, even if it is difficult for the user to see the display of the mouse cursor 20 in the case that the plural windows 18 are displayed on one of the display devices 16-1 through 16-k, as shown in the FIG. 3(A), the position of the mouse cursor 20 can stand out or be obvious: by a simple key operation by the user.

In accordance with the pointing method in the computer system 1 of the present invention, even if the user tends to lose sight of the mouse cursor 20 in the case that the images are displayed on the plural screens of the display devices 16-1 . . . 16-k, as shown in the FIG. 3(B), the position of the mouse cursor 20 can stand out since the colors of the large area around the mouse cursor 20 are changed and the image within the area, the color of which is changed, is blinked at intervals of about 1 ms to about 100 ms. Accordingly, even if the user loses sight of the mouse cursor 20 in the situation that it is difficult to find the mouse cursor 20, the user can easily locate the mouse cursor 20 and can perform the job.

Since the process in the computer system 1 for realizing the pointing method of the present invention is very simple as described above, the sizes of the input check section 102 and the drawing section 104 can be kept small, so that the application of the invention to the existing computer systems is easily performed.

The shape of the scope 22-1 and 22-2 shown in the FIGS. 4(B) and (C) is one examples, another shape, such as a circle shape rather than the rectangular shape is used as the shape of the scope 22-1 and 22-2 by appropriately changing the drawing section 104. Also, the method for inverting the image data within the area around the mouse cursor 20 used as the method for changing the color of the image within the area around the mouse cursor 20 can be replaced by another method, such as a method for multiplying the image data by a predetermined constant value, or a method for adding the constant value to the image data.

It is not necessary to use the clear outline as the outline of the area, the color of which is changed, around the mouse cursor 20. An area around the area, the color of which is changed, can be appropriately graded, or the gradation can be formed within the area, the color of which is changed.

Also, the processing method of the softwares in the computer 10 shown in the FIG. 5 is one of the examples, the process for changing the size of the area, the color of which is changed, around the mouse cursor 20 can be modified by using a constant value as the initial value of the variable L set in the drawing section 104, adding the predetermined number of PELs to the variable L (or subtracting the predetermined number of PELs from the variable L) whenever the process of the step S144 is terminated, and restoring the resulting value of the variable L to the initial value when the resulting value L exceeds a predetermined range.

In the case that the user does not touch the keyboard or the mouse of the computer 10 during a predetermined period, and the probability of losing sight of the mouse cursor 20 is high, the process can be modified to automatically change the color of the area around the mouse cursor 20.

The operation of the key and the mouse by the user for changing the color of the area around the mouse cursor 20 is one example, and this scheme can be modified by appropriately modifying the softwares of the computer 10 based upon the use and constitution of the computer system.

Each of the environments, settings and the processing steps of the computer system 1 can be replaced by other constitution and processing step described above as far as the similar functions and performance are realized.

It is claimed:

1. A method of assisting a user in locating a pointer on a display screen of a computer, said method comprising:

displaying an image on a display screen of a computer system, said image having image color data for displaying said image;

superimposing a pointer over said image on said display screen;

waiting for a selected input by a user;

identifying a location of said pointer after receiving said selected input;

determining a boundary on said display screen about said pointer, wherein an area enclosed by said boundary has a center on said display screen that is approximately collocated with said location of said pointer; and changing said image color data of said image within said boundary for a predetermined time period, such that said location of said pointer may be efficiently determined without obstructing said image.

2. The method of claim 1, and further comprising:

repeating the steps of determining and changing while progressively decreasing said area until said area equals a predetermined minimum value.

3. The method of claim 1, wherein said computer system includes a keyboard and wherein said step of waiting for a selected input by said user furthers comprises the step of waiting for said user to depress a selected key on said keyboard.

4. The method of claim 1, wherein said computer system includes a keyboard and a mouse, wherein said step of waiting for a selected input by said user further comprises the step of delaying for a selected time period following an input from said user utilizing said keyboard or said mouse.

5. The method of claim 1 wherein said step of changing said image color data of said image within said boundary for a predetermined time period further comprises the step of inverting said image color data.

6. The method of claim 1 wherein said step of changing said image color data of said image within said geometric shape for a predetermined time period further comprises the step of adding a constant value to said image color data.

7. The method of claim 1 wherein said step of changing said image color data of said image within said geometric shape for a predetermined time period further comprises the step of multiplying said image color data by a constant value.

8. The method of claim 1 wherein said boundary is a square.

9. The method of claim 1 wherein said boundary is a circle.

10. A system for assisting a user in locating a pointer on a display screen of a computer, said system comprising:

a computer having a display screen, a pointer, a user input device, a pointing device, and a storage;

an image displayed on said display screen, said image having image color data for displaying said image;

said pointer displayed on said display screen superimposed over said image;

a location finder routine in said storage and executable by said computer, wherein responsive to a selected input from said user input device, said location finder routine identifies a location of said pointer;

a boundary determiner routine in said storage and executable by said computer, wherein said boundary determiner routine determines a plurality of boundaries on said display screen about said pointer, wherein an area enclosed by said plurality of boundaries has a center on said display screen that is approximately collocated with said location of said pointer; and an image changer routine in said storage and executable by said computer, wherein said image changer routine changes said image color data of said image within said boundary for a predetermined time period, such that said location of said pointer may be efficiently determined without obstructing said image.

11. The system of claim 10, wherein said user input device is a keyboard and said selected input is a depression of a key on said keyboard.

12. The system of claim 10, wherein said user input device is a keyboard and said pointing device is a mouse, and wherein execution of said location finder routine is delayed for a selected time period following an input from a user utilizing said keyboard or said mouse.

13. The system of claim 10, wherein said image changer routine changes said image color data of said images within said plurality of boundaries for said predetermined time period by inverting said image color data.

14. The system of claim 10, wherein said image changer routine changes said image color data of said images within said plurality of boundaries for said predetermined time period by adding a constant value to said image color data.

15. The system of claim 10, wherein said image changer routine changes said image color data of said images within said plurality of boundaries for said predetermined time period by multiplying said image color data by a constant value.

16. The system of claim 10, wherein said plurality of boundaries are squares.

17. The system of claim 10, wherein said plurality of boundaries are circles.

18. An article of manufacture for use in a computer system for assisting a user in locating a pointer on a display screen of the computer system, the article of manufacture comprising computer readable storage media including program logic embedded therein that causes control circuitry to perform the steps of:

displaying an image on a display screen of a computer system, said image having image color data for displaying said image;

superimposing a pointer over said image on said display screen;

waiting for a selected input by a user;

identifying a location of said pointer after receiving said selected input;

determining a boundary on said display screen about said pointer, wherein an area enclosed by said boundary has a center on said display screen that is approximately collocated with said location of said pointer; and changing said image color data of said image within said boundary for a predetermined time period, such that said location of said pointer may be efficiently determined without obstructing said image.

19. The article of manufacture of claim 18, wherein said program logic causes said control circuitry to further perform the step of:

repeating the steps of determining and changing while progressively decreasing said area until said area equals a predetermined minimum value.

20. The article of manufacture of claim 18, wherein said computer system includes a keyboard and wherein said step of waiting for a selected input by said user furthers comprises the step of waiting for said user to depress a selected key on said keyboard.

21. The article of manufacture of claim 18, wherein said computer system includes a keyboard and a mouse, wherein said step of waiting for a selected input by said user further comprises the step of delaying for a selected time period following an input from said user utilizing said keyboard or said, mouse.

22. The article of manufacture of claim 18, wherein said step of changing said image color data of said image within said boundary for a predetermined time period further comprises the step of inverting said image color data.

23. The article of manufacture of claim 18, wherein said step of changing said image color data of said image within said geometric shape for a predetermined time period further comprises the step of adding a constant value to said image color data.

24. The article of manufacture of claim 18, wherein said step of changing said image color data of said image within said geometric shape for a predetermined time period further comprises the step of multiplying said image color data by a constant value.

25. The article of manufacture of claim 18, wherein said boundary is a square.

26. The article of manufacture of claim 18, wherein said boundary is a circle.

\* \* \* \* \*